T. Lowry,
Glass Furnace.
No. 100,424. Patented Mar. 1, 1870.

Witnesses
Josiah W. Ells
James M. Taylor

Inventor.
Thomas Lowry

United States Patent Office.

THOMAS LOWRY, OF PITTSBURG, PENNSYLVANIA.

Letters Patent No. 100,424, dated March 1, 1870.

IMPROVED KILN FOR ANNEALING GLASS.

The Schedule referred to in these Letters Patent and making part of the same.

I, THOMAS LOWRY, of Pittsburg, in the county of Allegheny, and State of Pennsylvania, have invented a new and useful Improvement in Annealing-Kilns or Furnaces, used for the purpose of flattening and annealing cylinders of glass, preparatory to their being cut into window-panes.

Heretofore the tablet or spreading-plates of such kilns have been made of fire-clay, or highly refractory sandstone, upon the surface of which the cylinder of glass is placed, lying with its split uppermost. The flame passing over it, causes it to open and fall back into a wavy sheet, the operator rubbing down the wavyness into a flat surface by means of a block of hard wood upon the end of an iron rod. But as the spreading-stones or tablets cannot be kept very even or smooth, owing to their friable nature, and as they absorb and retain more heat than is absolutely necessary for the accomplishment of the desired object, the soft glass molds itself to the unequal surface, and adheres to and takes up such particles of the stone or clay as cause a serious defect in the otherwise perfect sheet.

Nature and Objects of the Invention.

My invention consists in making the flattening-tablets of metal, each forming a shallow rectangular box, perfectly tight, and circulating therein steam, hot water, hot air, or other elastic fluids, as will tend to keep the upper surface of the tablets at such a temperature as is best suited to the flattening process, and yet prevent the adhesion of the glass, and by which an even clean surface can be at all times maintained.

Description of the Accompanying Drawings.

Figure 1:
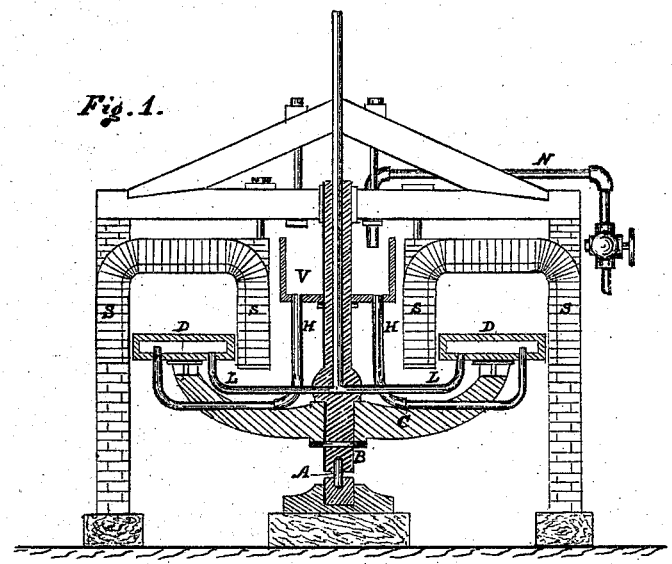

Figure 1 represents a transverse vertical section of my improved annealing and flattening-kiln.

Figure 2:
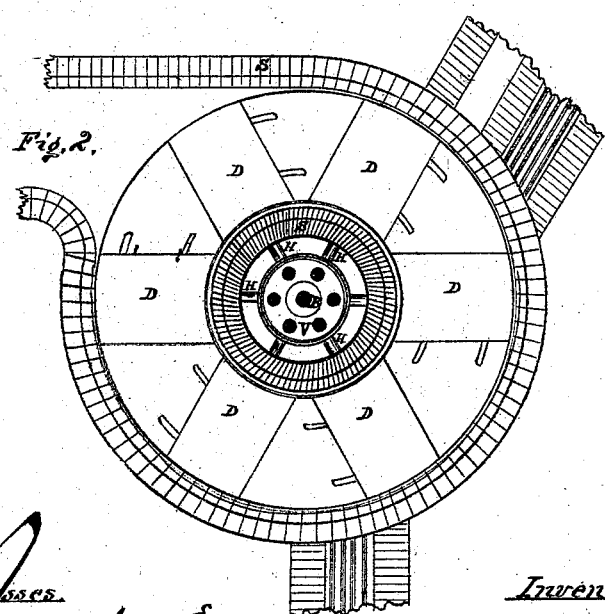

Figure 2, a transverse section on a horizontal plane, just above the tablets.

General Description.

This kiln consists of exterior and interior walls, S, the intervening space being a circular arched vault.

In this vault is a cast-iron frame, C, supported by a hollow vertical shaft, B, resting on a pivot, A, and capable of being turned round by a crank on the outside, connected to a shaft and wheels inside.

This frame C in the kiln carries the flattening-tablets D, which, in this case, are shallow, air-tight metallic boxes, perfectly flat on their upper side.

From the bottom and interior of each of these hollow tablets extend two pipes, one of which, H, enters the bottom of a tank, V, around the central shaft B, while the other communicates with the interior of said shaft, which is open at the top.

Water is conveyed to the tank V through a suitable supply-pipe N, provided with necessary cocks.

The kiln, on being heated to the proper degree of temperature, is worked in the following manner:

The cylinder of glass is placed in proper position on one of the tablets. The frame C is then turned until the cylinder is brought opposite the working-hole, through which it is flattened in the ordinary way.

During this operation, the water in the tank V is passing down the pipe H into the tablet, tending to keep it sufficiently cool to prevent the glass from sticking thereto.

As the water is soon brought to a boiling point, the steam generated is allowed to pass out of the tablet, through the exit-pipe L, into the shaft, and from thence into the atmosphere, or the pipes may be so arranged as that the steam and circulating water may be returned to the tank and worked over and over, which perhaps would be better than allowing it to escape.

Although my invention is described and shown as applied to a circular kiln, provided with a rotating frame and tablets, still I do not intend to limit myself to that peculiar mechanical construction of furnace or kiln, as it is applicable to all kinds of kilns used for annealing and flattening of glass, regardless of their shape or kind.

Claim.

I claim the hollow tablets, with the inlet and outlet-pipes, through which water, &c., could be introduced into the hollow plates of a furnace for annealing glass, &c.

THOMAS LOWRY.

Witnesses:
JOSIAH W. ELLS,
JAMES M. TAYLOR.